US007821677B2

(12) United States Patent
Tanaka et al.

(10) Patent No.: US 7,821,677 B2

(45) Date of Patent: Oct. 26, 2010

(54) METHOD AND APPARATUS FOR IMAGE FORMING CAPABLE OF ACCURATELY DETECTING DISPLACEMENT OF TRANSFER IMAGES AND IMAGE DENSITY

(75) Inventors: Kayoko Tanaka, Tokyo (JP); Kohta Fujimori, Yokohama (JP); Shin Hasegawa, Zama (JP); Shinji Kato, Kawasaki (JP); Nobutaka Takeuchi, Yokohama (JP); Naoto Watanabe, Atsugi (JP); Yuushi Hirayama, Sagamihara (JP); Hitoshi Ishibashi, Kamakura (JP); Osamu Ariizumi, Yokohama (JP); Takashi Enami, Chigasaki (JP); Kazumi Kobayashi, Tokyo (JP); Shinji Kobayashi, Atsugi (JP); Fukutoshi Uchida, Kawasaki (JP); Ryohta Morimoto, Ebina (JP)

(73) Assignee: Ricoh Company, Ltd., Tokyo (JP)

( * ) Notice: Subject to any disclaimer, the term of this patent is extended or adjusted under 35 U.S.C. 154(b) by 1119 days.

(21) Appl. No.: 11/430,978

(22) Filed: May 10, 2006

(65) Prior Publication Data

US 2006/0274628 A1 Dec. 7, 2006

(30) Foreign Application Priority Data

May 10, 2005 (JP) ............................ 2005-137409

(51) Int. Cl.
*H04N 1/04* (2006.01)

(52) U.S. Cl. ........................ 358/474; 358/501; 358/1.9; 358/530; 399/49; 399/100

(58) Field of Classification Search ................. 358/474, 358/1.15, 501, 498, 1.9, 1.2, 497, 496, 514, 358/530, 3.06, 448, 509, 475; 399/49, 66, 399/297, 299, 302, 303, 55, 72, 298
See application file for complete search history.

(56) References Cited

U.S. PATENT DOCUMENTS 5,182,600 A * 1/1993 Hasegawa et al. ............. 399/74

(Continued)

FOREIGN PATENT DOCUMENTS

JP 58-160441 10/1983

(Continued)

OTHER PUBLICATIONS

Office Action for corresponding Japanese patent application No. 2005-137409.

*Primary Examiner*—Negussie Worku
(74) *Attorney, Agent, or Firm*—Harness, Dickey & Pierce, P.L.C.

(57) ABSTRACT

An image forming apparatus includes a plurality of image carriers, an image forming mechanism, a seamless belt-like intermediate transfer body or a transfer material carrier, a detection mechanism, and an optical detecting apparatus. The optical detecting apparatus includes at least a printed board, and a plurality of photodetectors formed of a light-emitting element, a light-receiving element and light-shielding members, which are mounted on the printed board. The optical detecting apparatus is disposed such that it detects a belt surface adjacent to rollers of the intermediate transfer body or the transfer material carrier, and either displacement of a transfer image or image density is detected by a plurality of photodetectors detecting pattern images which are transferred from the plurality of image carriers to the image transfer body or the transfer material carrier.

15 Claims, 7 Drawing Sheets

U.S. PATENT DOCUMENTS

| | | | | |
|---|---|---|---|---|
| 5,198,861 | A | 3/1993 | Hasegawa et al. | |
| 5,298,944 | A * | 3/1994 | Sawayama et al. | 399/49 |
| 5,327,196 | A | 7/1994 | Kato et al. | |
| 5,387,965 | A | 2/1995 | Hasegawa et al. | |
| 5,475,476 | A | 12/1995 | Murai et al. | |
| 5,630,195 | A | 5/1997 | Sawayama et al. | |
| 5,682,572 | A | 10/1997 | Murai et al. | |
| 5,761,570 | A | 6/1998 | Sawayama et al. | |
| 5,860,038 | A | 1/1999 | Kato et al. | |
| 6,055,386 | A | 4/2000 | Kato et al. | |
| 6,160,569 | A | 12/2000 | Fujimori et al. | |
| 6,496,677 | B2 | 12/2002 | Fujimori | |
| 6,526,235 | B2 | 2/2003 | Kato | |
| 6,529,695 | B2 * | 3/2003 | Katayanagi et al. | 399/49 |
| 6,594,453 | B2 | 7/2003 | Kato | |
| 7,027,139 | B2 * | 4/2006 | Ogihara et al. | 356/218 |
| 7,085,524 | B2 * | 8/2006 | Soda et al. | 399/302 |
| 7,215,896 | B2 * | 5/2007 | Yamada et al. | 399/49 |
| 7,260,335 | B2 * | 8/2007 | Kato et al. | 399/49 |
| 7,535,594 | B2 * | 5/2009 | Yoshizawa et al. | 358/1.4 |
| 7,655,936 | B2 * | 2/2010 | Sawayama et al. | 250/559.4 |
| 2002/0041771 | A1 * | 4/2002 | Katayanagi et al. | 399/66 |
| 2002/0090228 | A1 * | 7/2002 | Takahashi et al. | 399/111 |
| 2003/0016399 | A1 * | 1/2003 | Hiromatsu | 358/474 |
| 2004/0136760 | A1 * | 7/2004 | Yoshida et al. | 399/302 |
| 2004/0146312 | A1 * | 7/2004 | Saito et al. | 399/55 |
| 2004/0253012 | A1 * | 12/2004 | Ishibashi | 399/49 |
| 2005/0019048 | A1 * | 1/2005 | Kato | 399/49 |
| 2009/0202263 | A1 * | 8/2009 | Yoshida et al. | 399/49 |

FOREIGN PATENT DOCUMENTS

| | | |
|---|---|---|
| JP | 08-082599 | 3/1996 |
| JP | 09-089769 | 4/1997 |
| JP | 09-321597 | 12/1997 |
| JP | 2000-322990 | 11/2000 |
| JP | 2003-098791 | 4/2003 |
| JP | 2004-127856 | 4/2004 |
| JP | 2005-037585 | 2/2005 |
| JP | 2005-091252 | 4/2005 |

* cited by examiner

METHOD AND APPARATUS FOR IMAGE FORMING CAPABLE OF ACCURATELY DETECTING DISPLACEMENT OF TRANSFER IMAGES AND IMAGE DENSITY

This patent specification is based on and claims priority under 35 U.S.C. §119 on Japanese patent application, No. JP2005-137409 filed on May 10, 2005 in the Japanese Patent Office, the entire contents of which are incorporated herein by reference.

BACKGROUND

1. Field

The present invention generally relates to an image forming method and/or apparatus. More particularly, it may relate to an image forming method and/or apparatus capable of accurately detecting pattern images formed on a detection target such as image carriers or an intermediate transfer body, or a transfer-material carrier, for example.

2. Discussion of the Background

Background electrophotographic image forming apparatuses such as copiers, printers, facsimiles, and the like create a toner image on a surface of an image carrier (i.e., a photoconductor) or an intermediate transfer body. These apparatuses generally form a toner pattern image for test and detect a density of the toner pattern image typically by using an optical detecting apparatus having a photodetector. Based on a result of the detection, the apparatuses adjust the density so as to obtain a stable image density.

The optical detecting apparatus generally includes a reflection-type photodetector that has a light-emitting element and a light-receiving element. To detect the toner pattern image, the optical detecting apparatus emits light from the light-emitting element onto a toner pattern image and detects, with the light-receiving element, the light reflected from the toner pattern image.

A variety of reflection-type photodetectors have been proposed for such a purpose. One example reflection-type photodetector includes a number of components such as a light-emitting element, an oscillator, a drive circuit, a light receiving part, a processing circuit and so on, which are mounted on a single circuit board, serving as one module.

In general, the above-described background image forming apparatuses have been subjected to crucial requirements of downsizing. To reduce a size of the image forming apparatus, almost every space available inside the image forming apparatus may be used to enclose as many parts as possible. This results in a growing number of restrictions on space in which to arrange the photoreceptors; therefore an arrangement of the reflection-type photodetectors has become more difficult.

Some image forming apparatuses use an optical detecting apparatus having a plurality of photodetectors to detect a toner pattern image formed particularly on an intermediate transfer belt so as to improve detection accuracy and reduce detecting time. However, as the number of photodetectors are increased, the dimension of the optical detecting apparatus including an operating circuit for photodetectors becomes larger than a conventional single photodetector. Consequently, the optical detecting apparatus cannot be arranged at a position considered as optimum for control.

When a printed circuit board is provided with a plurality of photodetectors, a corresponding number of operating circuits for the plurality of photodetectors also need to be provided. In this case, however, a number of physical and spatial restrictions may be enforced on an installation of the optical detecting apparatus to the image forming apparatus. For example, it may be difficult to find space for screw holes in a surface of the print circuit board for securing the optical detecting apparatus to the image forming apparatus.

It may also be difficult to reserve space on the printed circuit board for circuit constituent parts such as connecting parts for inputting and outputting signals. With a relatively small number of photodetectors, all the circuit constituent parts can be arranged on the printed circuit board. However, when a relatively large number of photodetectors are required, arranging the circuit constituent parts on the print circuit board may inevitably fail, resulting in a redesign to enlarge the dimension of the print circuit board.

In addition, when a relatively large number of photodetectors are installed in the optical detecting apparatus, as described above, the constituent parts may intervene as an obstruction to an optical path of the photodetectors. Also, with a relatively large number of photodetectors installed, wiring patterns for the circuits of the photodetectors become complicated, so that such complication on the printed circuit board may cause crosstalk among the wiring patterns.

SUMMARY

In view of the foregoing, it is an object of at least one example embodiment of the present invention to provide a novel image forming apparatus which includes an optical detecting apparatus which reduces or even prevents upsizing of dimension, permits appropriate layout of circuit constituent parts on a printed board even in the image forming apparatus with many spatial restrictions, and improves upon or even solves a negative impact on optical characteristics.

In one example embodiment, a novel image forming apparatus may include image carriers, an image forming mechanism for forming an image on the image carriers, a seamless belt-like intermediate transfer body or a transfer material carrier which is laid across a plurality of rollers and a detection mechanism for detecting pattern images formed on the image carriers or the intermediate transfer body, or the transfer material carrier. The image forming apparatus further includes an optical detecting apparatus.

In one example embodiment of the above-mentioned image forming apparatus, a plurality of image carriers may be provided along the intermediate transfer body or the transfer material carrier. Multi-color images or full-color images are formed by overlapping images of different colors formed on the plurality of image carriers onto the intermediate transfer body or the transfer material carrier. The optical detecting apparatus may be disposed such that the optical detecting apparatus detects a belt surface adjacent to rollers of the intermediate transfer body or the transfer material carrier, and either positional displacement of a transfer image or image density is detected by a plurality of photodetectors detecting pattern images which are transferred from the plurality of image carriers to the image transfer body or the transfer material carrier.

An example embodiment of the above-mentioned optical detecting apparatus for detecting pattern images formed on a detection target may include at least a printed board and photodetectors formed of a light-emitting element and a light-receiving element, and light-shielding members which are mounted on the printed board. At least one of the photodetectors may be disposed on the printed board so as to detect the surface of the detection target. A part of circuit constituent parts of the photodetectors on the printed board may be enclosed in the light-shielding members.

In an example embodiment of the above-mentioned optical detecting apparatus, the circuit constituent parts enclosed in the light shielding members may be disposed on back sides of the light-emitting element and the light-receiving element.

An example embodiment of the above-mentioned optical detecting apparatus further may include a sensitivity adjusting mechanism for the light-receiving element, and the sensitivity mechanism is not enclosed in the light-shielding members.

An example embodiment of the above-mentioned optical detecting apparatus further may include a light shielding member having storage space for the circuit constituent parts.

In an example embodiment of the above-mentioned optical detecting apparatus, the light-shielding member may include at least one protrusion on the surface thereof in contact with the printed board.

In an example embodiment of the above-mentioned optical detecting apparatus, the detection target may include image carriers or an intermediate transfer body, or a transfer material carrier of the image forming apparatus.

BRIEF DESCRIPTION OF THE DRAWINGS

A more complete appreciation of the disclosure and many of the attendant advantages thereof will be readily obtained as the same becomes better understood by reference to the following detailed description of example embodiments when considered in connection with the accompanying drawings, wherein.

DETAILED DESCRIPTION OF EXAMPLE EMBODIMENTS

Figure 1:
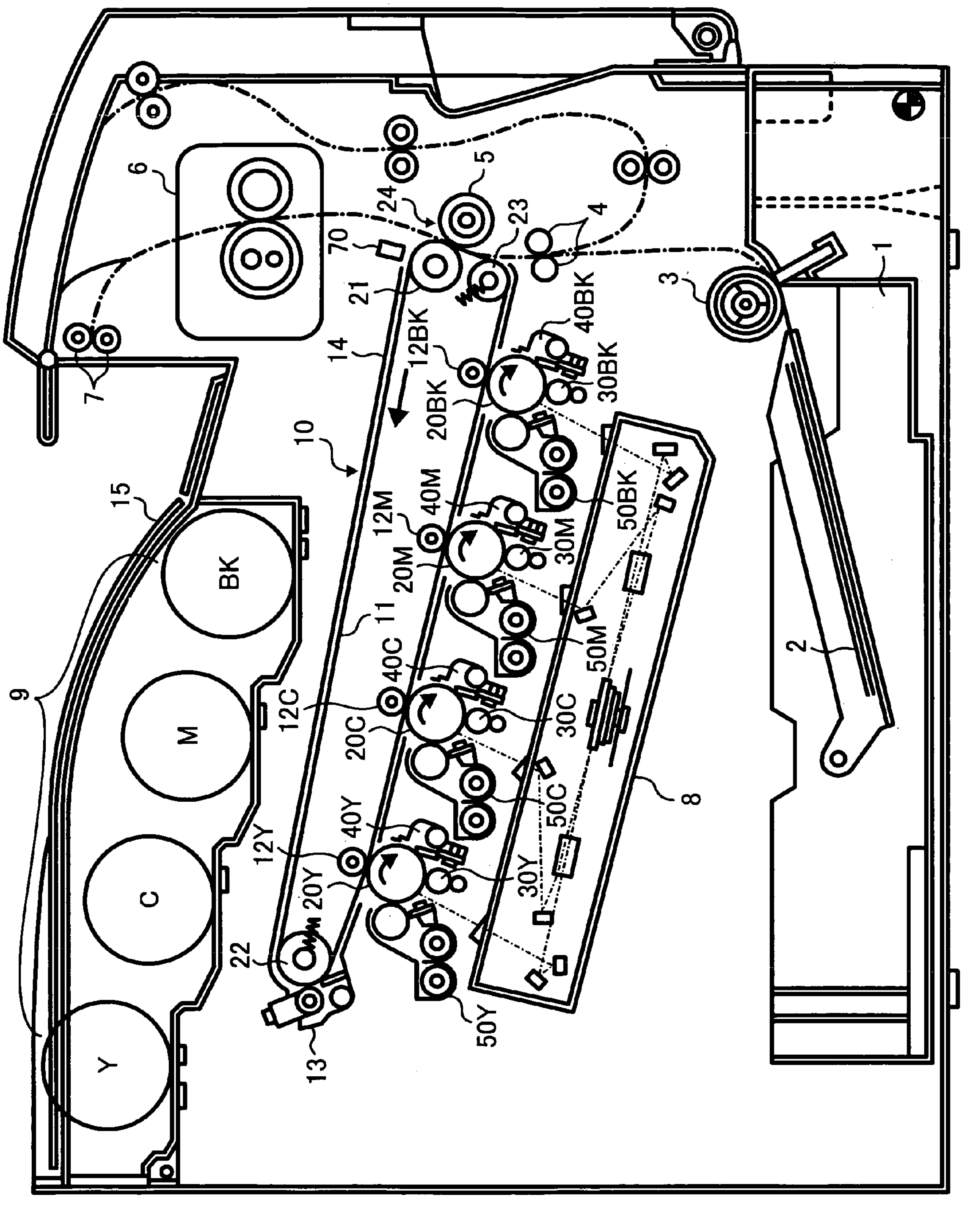
FIG. 1 is a schematic diagram of an image forming apparatus according to one embodiment of the present invention.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, like reference numerals designate identical or corresponding parts throughout the several views.

Referring to FIG. 1, an electrophotographic color printer (hereinafter referred to as a printer) is explained as one example of an image forming apparatus according to an example embodiment of the present invention. The printer illustrated in FIG. 1 includes four color image forming units corresponding to colors of yellow (hereinafter referred to as "Y"), cyan (hereinafter referred to as "C"), magenta (hereinafter referred to as "M") and black (hereinafter referred to as "BK"), and toner images of each color which have been formed in the image forming units of each color are overlapped onto a seamless belt-like intermediate transfer body 11, and thereafter the toner images are transferred to a transfer material 2 (for example, transfer paper) at once.

In this embodiment, the image forming units of each color include four process cartridges that are disposed in a tandem. On the upper portion of the four process cartridges, an intermediate transfer apparatus 10 is disposed, and paper conveyance is performed in the lengthwise direction so that the initial printing time is shortened.

The printer illustrated in FIG. 1 includes four photoconductive drums 20Y, 20C, 20M and 20BK as image carriers. In this embodiment, an example is given of drum-type photoconductors, however, belt-type photoconductors may also be utilized. Each of the photoconductive drums 20Y, 20C, 20M and 20BK are rotatively driven in an arrow direction as shown in FIG. 1, contacting the seamless belt-like intermediate transfer body 11 of a primary transfer apparatus 10. Since surrounding constitutions of each of the photoconductive drums 20Y, 20C, 20M and 20BK are the same, the reference numerals Y, C, M and BK for distinguishing each color are omitted, and the surrounding structure of only one photoconductive drum is explained.

Around the photoconductive drum 20, along the surface movement direction thereof, a charging apparatus 30 as a charging device, a developing apparatus 50 as a developing device and a drum cleaning apparatus 40 as a toner recovery device are disposed accordingly. Between the charging apparatus 30 and the developing apparatus 50, some space is secured in order for the light flux emitted from an exposure apparatus 8 as latent image forming device to pass through, reaching the photoconductive drum 20.

The charging apparatus 30 includes a charging roller as a charging member and causes the charging roller 30 to come into contact with the surface of photoconductive drum 20 so as to apply charging bias to the charging roller 30 and uniformly charge the surface of the photoconductive drum 20. As the charging bias to apply to the charging roller 30, charging bias in which alternating-current bias is superimposed on direct-current bias, charging bias with only direct-current bias, and the like may be used. Furthermore, in the charging apparatus of the embodiment, a cleaning brush which cleans the surface of the charging roller 30 is provided. The cleaning brush removes toner adhered to the surface of the charging roller 30, thereby preventing defective charging due to toner adhered to the charging roller 30.

The uniformly charged surface of the photoconductive drum 20 is exposed by the exposure apparatus 8 in the above-described manner, and electrostatic latent images corresponding to each color are formed on the surface of the photoconductive drum 20. Based on image information corresponding to each color, the exposure apparatus 8 writes the electrostatic latent images corresponding to each color onto the photoconductive drum 20.

Figure 2:
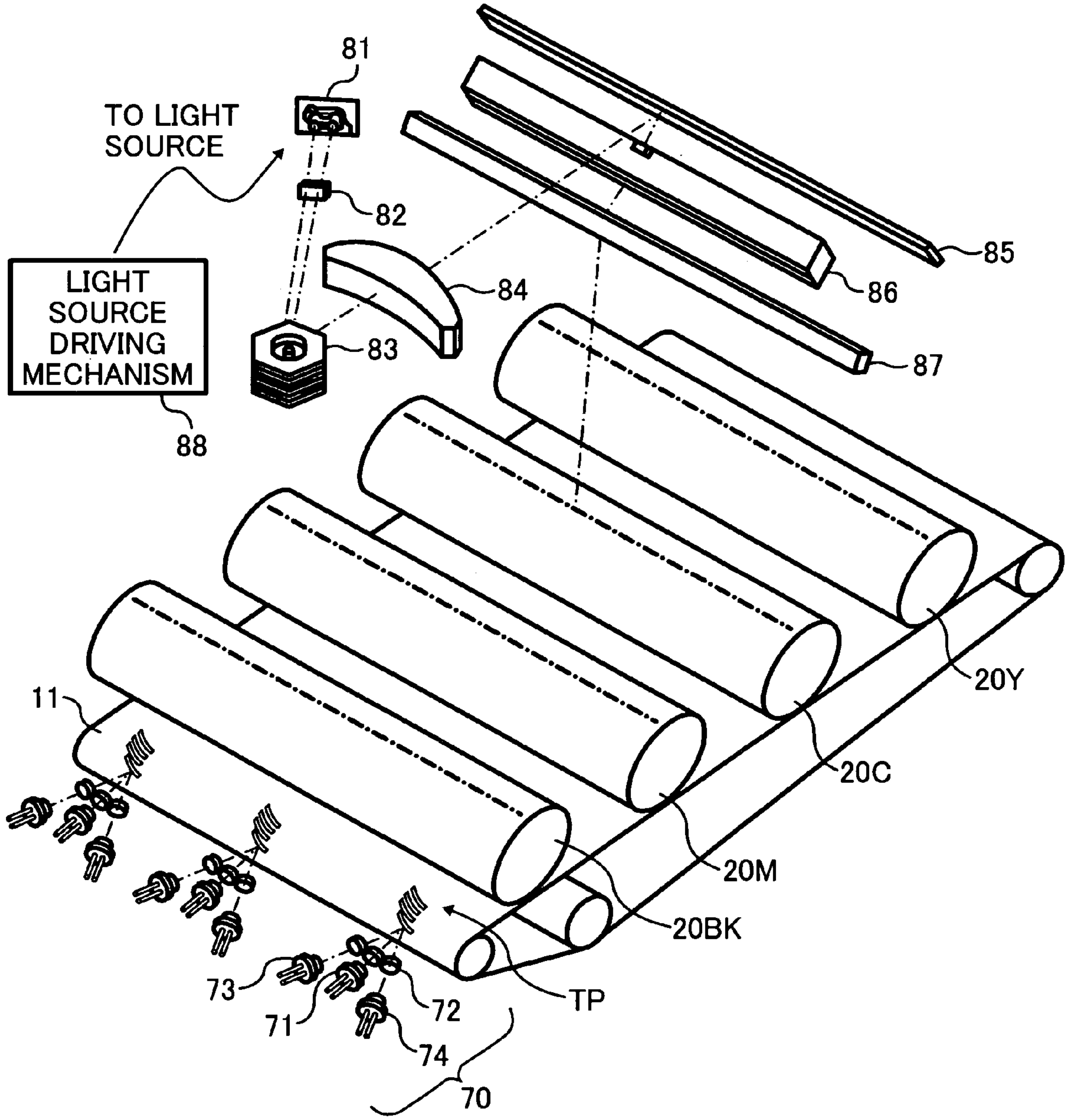
FIG. 2 is a schematic diagram of an exposure apparatus and a plurality of photodetectors for pattern image detection arranged in the image forming apparatus of FIG. 1.

The exposure apparatus 8 of this embodiment is, as illustrated in FIG. 2, for example, a laser-scan type exposure apparatus or a laser writing apparatus which includes a scan optical system and the like formed of a light source apparatus 81 including a semiconductor laser and a coupling lens, a cylindrical lens 82, a light deflector 83 or a rotating multi-faced mirror or the like, a scan imaging lens 84, mirrors 85 and 87, and a correction lens 86. In FIG. 2, only one optical system is shown. However, in practice, four light source apparatuses 81 are provided corresponding to four photoconductive drums 20Y, 20C, 20M and 20BK.

The four laser beams from the four light source apparatuses 81 are sorted in a single light deflector 83 and deflectively scanned. Then the four laser beams are collected in the corresponding photoconductive drums 20Y, 20C, 20M and 20BK and scanned in the four optical systems. In this embodiment, a laser-scan type exposure apparatus is used, however, other types of exposure apparatuses such as the one formed of a light-emitting diode (LED) array and imaging devices (rod-lens array, micro-lens array, and the like) may be applied.

In the developing apparatus 50, a developing roller as a developer carrier are partially exposed from an opening of the casing. In the developing apparatus 50 of this embodiment, a dual-component developer which is formed of, for example, toner and a magnetic carrier (hereinafter referred to as carrier) is used. However, a mono-component developer, which does not contain a carrier, may be used.

The developing apparatus 50 receives toner supply of corresponding colors from toner bottles 9Y, 9C, 9M and 9BK as a toner storing device and stores the toner supply inside. The toner bottles 9Y, 9C, 9M and 9BK are configured such that the toner bottles are attachable to/detachable from the printer main body so that each toner bottle can be individually replaced. Such a configuration makes it possible to replace only the toner bottles 9Y, 9C, 9M and 9BK, when running out of the toner.

The toners supplied from the toner bottles 9Y, 9C, 9M and 9BK to each developing apparatus 50 are conveyed and carried onto the developing roller while being mixed with the carrier by a mixing conveyance screw in the developing apparatus. Developing bias is applied from a not-shown power source to the developing roller, thereby forming a developing electric field in a developing region. Between the electrostatic latent image on the photoconductive drum 20 and the developing roller, an electrostatic force in a direction toward the electrostatic latent images is applied to the toners on the developing roller so that the toners on the developing roller adhere to the electrostatic latent images on the photoconductive drum 20, and thereby the electrostatic latent images on the photoconductive drum 20 are developed into toner images corresponding to each color.

The intermediate transfer belt 11 of the primary transfer apparatus 10 is tightly extended between three supporting rollers 21, 22 and 23, and endlessly moves in an arrow direction of the figure. The toner images of each color on each of the photoconductive drums 20Y, 20C, 20M and 20BK are transferred and overlapped onto the intermediate transfer belt 11 by the electrostatic transfer method.

The electrostatic transfer method includes a system using a transfer charger. However, in this embodiment, a system using transfer rollers 12Y, 12C, 12M and 12BK, which generate less transfer debris, is adopted.

In particular, on a rear surface of a portion of the intermediate transfer belt 11 in contact with each of the photoconductive drum 20Y, 20C, 20M and 20BK, the primary transfer rollers 12Y, 12C, 12M and 12BK as a transfer device are disposed, respectively. In this embodiment, a portion of the intermediate transfer belt 11 pressed by each of the primary transfer rollers 12Y, 12C, 12M and 12BK, and each of the photoconductive drums 20Y, 20C, 20M and 20BK form a primary transfer nip part. Further, when the toner images on each of photoconductive drums 20Y, 20C, 20M and 20BK are transferred onto the intermediate transfer belt 11, the transfer bias is applied to each of the primary transfer rollers 12Y, 12C, 12M and 12BK.

Accordingly, a transfer electric field is formed at each primary transfer nip part. Further, the toner images of each color on each of the photoconductive drums 20Y, 20C, 20M and 20BK are electrostatically adhered onto the intermediate transfer belt 11 and transferred while the toner images of each color are overlapped.

On the above-described part of the intermediate transfer belt 11 which is tightly extended between the supporting rollers 21, a secondary transfer roller 5 is disposed in contact with the part of the intermediate transfer belt 11. In a gap between the intermediate transfer belt 11 and the secondary transfer roller 5, a secondary transfer nip part 24 is formed, and transfer paper 2 as a transfer material is sent thereto at predetermined timing.

The transfer paper 2 is stored in a sheet paper cassette 1 located at the bottom of the exposure apparatus 8 of FIG. 1, and conveyed to the secondary transfer nip part 24 by a paper supply roller 3 and a pair of resist rollers 4 and so forth. Then, the toner images overlapped onto the intermediate transfer belt 11 are transferred at once onto the transfer paper in the secondary transfer nip part 24. At the secondary transfer, the transfer bias is applied to the secondary transfer roller 5 so that the transfer electric field formed, and thereby the toner images on the intermediate transfer belt 11 are transferred onto the transfer paper.

In a downstream transfer paper conveyance direction of the secondary transfer nip part 24, a fixing apparatus 6 as a fixing device is disposed. The fixing apparatus 6 includes a heating roller in which a heater is embedded and a pressure roller for applying pressure. The transfer paper 2 which has passed through the secondary transfer nip part 24 is conveyed through the gap between the rollers of the fixing apparatus 6 and is subjected to heat and pressure. Accordingly, toner on the transfer paper 2 is fused, and the toner images are fixed onto the transfer paper 2. Subsequently, the transfer paper 2 having been fixed is ejected by paper ejecting rollers 7 onto a paper ejecting tray 15 on the upper aspect of the printer.

Around each of the above-described photoconductive drums 20Y, 20C, 20M and 20BK, drum cleaning apparatuses 40 as a device for removing and collecting toner remained on the surfaces of the photoconductive drums after the primary transfer are provided. The drum cleaning apparatuses 40 are configured to collect the toner waste adhered to the surfaces of the photoconductive drums by a fur brush or a cleaning blade or the like. Further, the collected toner waste is conveyed from the inside of the drum cleaning apparatuses 40 to a not-shown waste toner tank by the conveyance devices such as a conveyance screw, a conveyance coil, a powder conveyance apparatus using an air current, or the like.

Furthermore, around the intermediate transfer belt 11, a belt cleaning apparatus 13 as a toner collecting device for removing and collecting the toner remained on the surface of the belt after the secondary transfer is provided. The belt cleaning apparatus 13 is configured to collect the toner waste adhered to the surface of the intermediate transfer belt 11 by a fur brush or a cleaning blade or the like. Further, the collected toner waste is conveyed from the inside of the belt cleaning apparatus 13 to a not-shown waste toner tank by the conveyance devices such as a conveyance screw, a conveyance coil, a powder conveyance apparatus using an air current, or the like.

In the tandem-type color image forming apparatus having a structure as shown in FIG. 1, because of the structure, an alignment technique of each color becomes a major issue. Elements which cause misalignment of each color mainly include skew, a resist deviation in a subscanning direction, a pitch deviation in a subscanning direction, a resist deviation in a main scanning direction, a magnification error in a main scanning direction and so forth.

Accordingly, the color image forming apparatus in an embodiment of the present invention carries out correction of misalignment of each color prior to a color image forming operation with respect to the transfer paper 2. The correction technique includes, for example in one embodiment, a method in which the toner pattern images of each color are formed on each of the photoconductive drums 20Y, 20C, 20M and 20BK. Subsequently, the toner pattern images are transferred onto the intermediate transfer belt 11, and then the transferred toner pattern images are detected by an optical detecting apparatus or photodetector 70 to detect the resist deviation and the pitch of the pattern images of each color in a main- and sub-scanning directions, thereby correcting misalignment and the like.

An illustrative embodiment for detecting the toner pattern images is that, for example, as shown in FIG. 2, toner pattern image TPs for correcting misalignment of each color are formed at three areas on the intermediate transfer belt 11, and the toner pattern image TPs are detected by the optical detecting apparatus which includes three photodetectors 70. In this embodiment, the three photodetectors 70 are disposed at both ends and the center of the intermediate transfer belt 11 in the main scanning direction so as to form the toner pattern image TPs of each color in association with the position of photodetectors 70, respectively.

Such toner pattern image TPs are detected, as the intermediate transfer belt 11 rotatively moves, passing the photodetectors 70 in order. Subsequently, based on the detection information, a not-shown control part detects the resist deviation and the pitch of the toner pattern image TPs of each color in the main- and sub-scanning directions, calculates a correction value so as to control a light source driving device 88 and the like of the exposure apparatus 8, and corrects misalignment by correcting writing timing of the latent image with respect to each photoconductor.

In such a manner, in this embodiment, a plurality of photodetectors 70 are provided as an optical detecting apparatus which forms the toner pattern image TPs for detecting the resist deviation and the like on the intermediate transfer belt 11, and detects the toner pattern images thereof. One photodetector 70 includes, for example, a light-emitting element 71, a lens 72, a light-receiving elements 73 and 74, and is disposed adjacent to one of the rollers between which the intermediate transfer belt 11 is extended so that the toner pattern image TPs on the belt surface are detected. Furthermore, the photodetectors 70 in FIG. 2 are provided to detect the resist deviation, however, photodetectors for detecting toner density can be provided in the same manner.

In the above-described embodiment, a tandem-type color image forming apparatus (color printer) using an intermediate transfer belt is used. However, a structure, in which images of the photoconductive drums 20Y, 20C, 20M and 20BK are directly transferred to a transfer material without using the intermediate transfer belt, may be applied.

In this case, the intermediate transfer belt 11 of FIG. 2, for example, serves as a transfer material conveyance belt for conveying the transfer material. In addition, even in a case where the transfer belt 11 serves as the transfer material conveyance belt, the detecting method for the resist deviation and so forth is the same, and the toner pattern TPs for detecting the resist deviation and image density are formed on the transfer material conveyance belt. Subsequently, the toner patterns thereof are detected by a plurality of the photodetectors 70 of the optical detecting apparatus.

In a case where a plurality of photodetectors 70 are disposed relative to the intermediate transfer belt 11, for the sake of easiness of alignment and installation, it has been practiced that a plurality of photodetectors, which are mounted on a single printed board, form an optical detecting apparatus. However, when a plurality of photodetectors are mounted on a single printed board, the number of drive circuits of the photodetectors increases.

Consequently, there will be more spatial restrictions on the printed board, on which circuit constituent parts are laid out, such as positions of holes for the screws for securing the optical detecting apparatus to the image forming apparatus and connector parts for inputting and outputting signals. On the other hand, when the number of photodetectors are small, it is possible to layout parts on the printed board. However, even if the parts are laid out thereon, it is unavoidable that the dimension of the printed board becomes larger.

Figure 8:
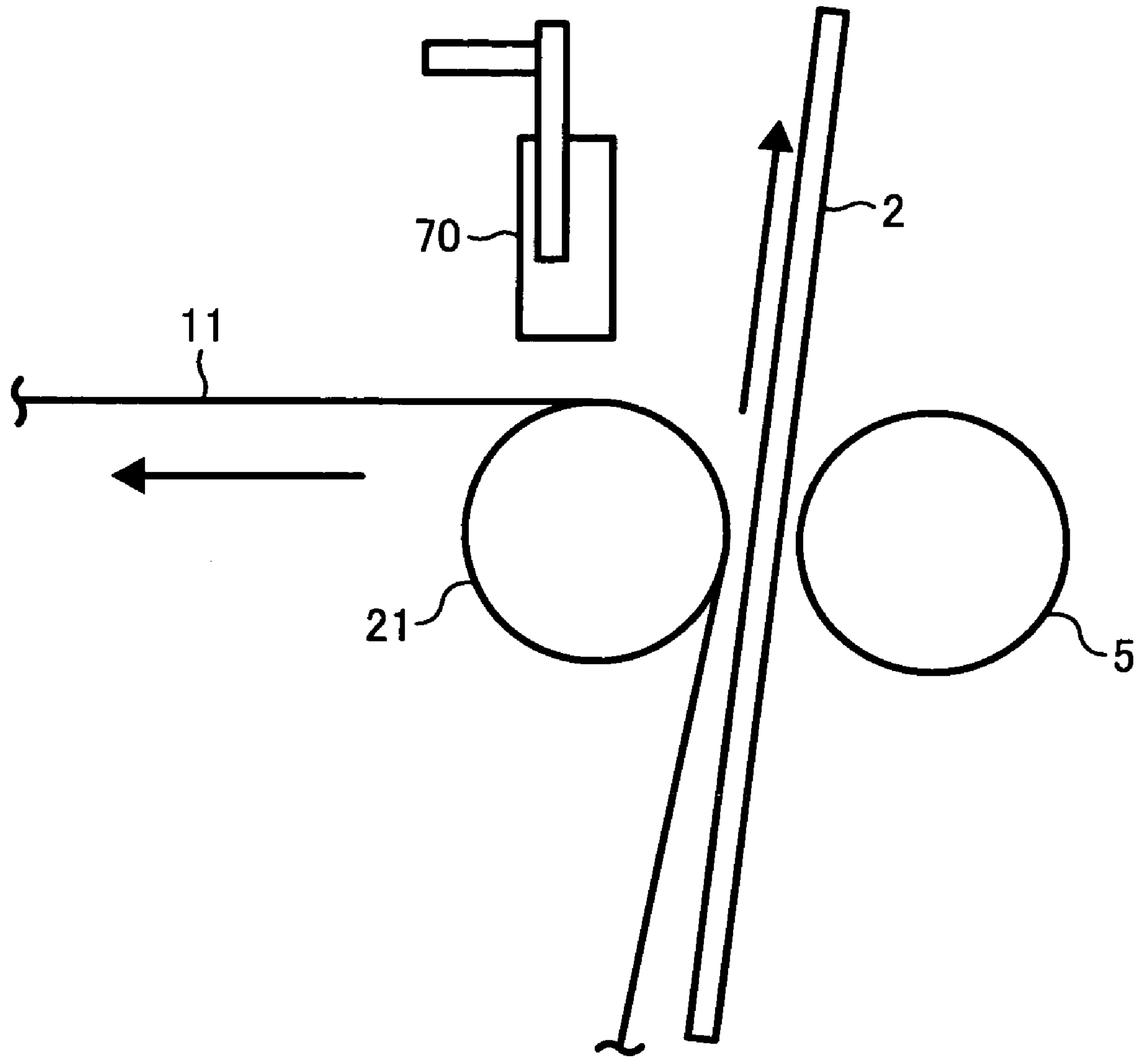
FIG. 8 is a schematic diagram for explaining an arrangement of the plurality of photodetectors with respect to an intermediate transfer belt and a secondary transfer position.

Furthermore, as shown in FIG. 1 and FIG. 8, in a case where the photodetectors 70 are disposed adjacent to the roller 21 of the intermediate transfer belt across from the secondary transfer roller 5 so as to detect toner pattern images, it is possible for the surface of the casing of the photodetectors 70 to scrape the images during a process in which the transfer paper 2 is being conveyed after the secondary transfer. Therefore, it is required that the surface of the casing on a side of paper conveyance path of the photoconductors 70 be thin.

Although there are restrictions on the front face (on the paper passage side) of photodetectors 70 as described above, since connectors and so forth for electrically connecting to the image forming apparatus main body are provided on the backside of photodetectors 70, it is not problematic to slightly enlarge the printed board. Consequently, inventors of the embodiments of present invention come to propose a structure of an optical detecting apparatus which satisfies the restrictions using the space.

A description will be now given of an example of an optical detecting apparatus including a printed board, and more than one photodetector including a light-emitting element, a light-receiving element, a lens and light shielding members, which are mounted on the surface of the printed board.

Since a conventional optical detecting apparatus has a small number (for example, three pieces as shown in FIG. 2) of photodetectors 70 on a single printed board, a part mounting area limited only to the front face of the printed board provides sufficient space for parts. However, as shown in FIG. 6 which illustrates an example structure of an optical detecting apparatus, in a case of an optical detecting apparatus in which seven photodetectors 70 are mounted on one printed board 76, it is difficult to mount all the parts on the front surface of the printed board.

Figure 5:
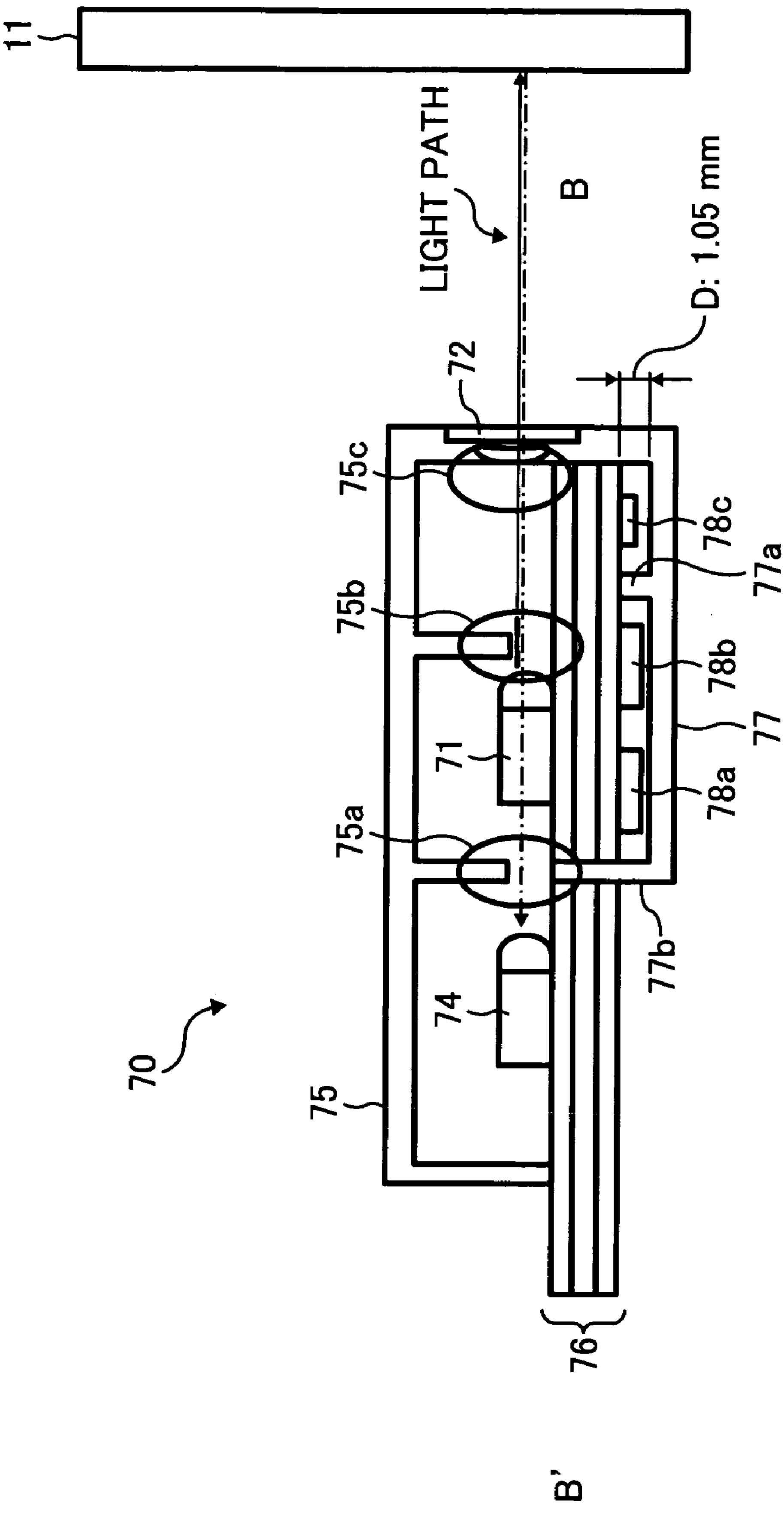
FIG. 5 is a cross sectional view illustrating one of the plurality of photodetectors in a B-B' direction.
Figure 6A:
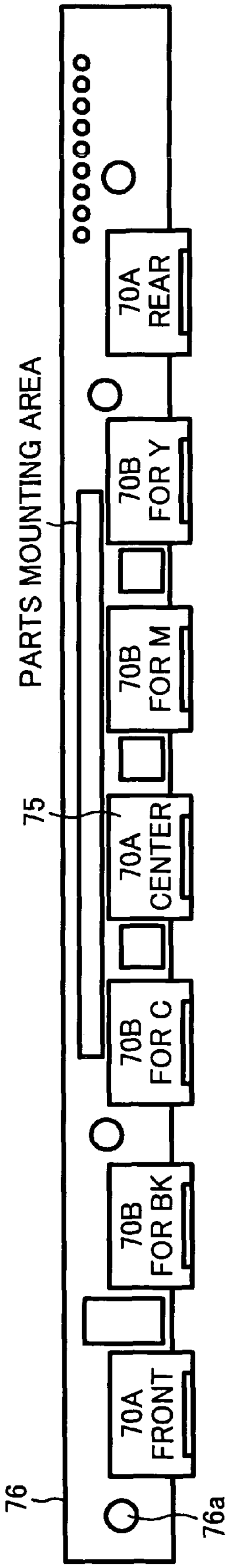
FIG. 6A is a schematic diagram illustrating a front surface of the optical detecting apparatus.
Figure 6B:
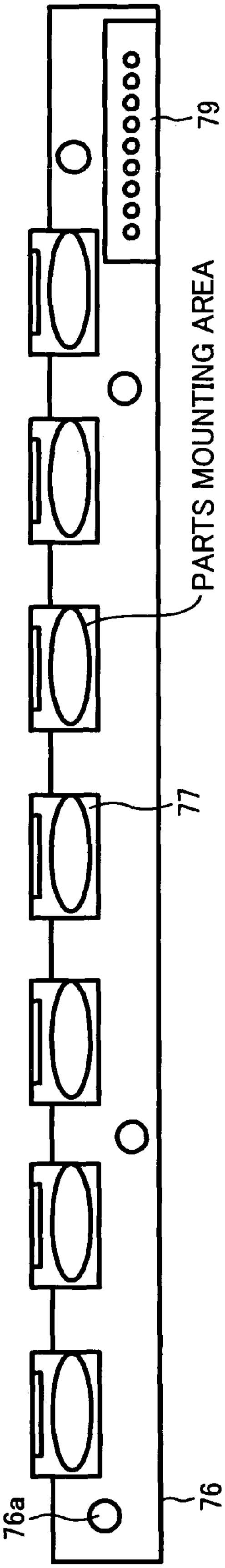
FIG. 6B is a schematic diagram illustrating a rear surface of the optical detecting apparatus.

Therefore, in this embodiment, as shown in FIGS. 5, 6A and 6B, circuit constituent parts 78*a*, 78*b* and 78*c* are disposed or mounted inside a light shielding member (hereinafter referred to as a lower case) 77 on the rear surface of the printed board 76 on which connectors 79 and so forth of the printed board 76 are provided. In other words, as shown in FIG. 5, board layout is performed on the printed board 76 such that the circuit constituent parts 78*a*, 78*b* and 78*c* are disposed inside the lower case 77. In FIGS. 6A and 6B, three photodetectors 70A for detecting resist deviation are disposed at both ends and the center of the printed board 76, and four photodetectors 70B for detecting toner density or a toner adherence amount for each color are disposed between the photodetectors 70A.

Brackets for retaining the optical detecting apparatus to the image forming apparatus main body include metal parts. Thus, a problem associated with insulation may be generated, if the circuit constituent parts are mounted on the rear surface of the printed board 76 on which the photodetectors are mounted. However, according to this embodiment, when the lower case 77 is made of an insulating material such as plastic or ceramic, the case 77 itself serves as an insulator, and consequently an effect in which the insulation problem can be reduced or even avoided is attained.

Furthermore, even if the thickness of the rear surface is approximately the same as the height of parts, when the rear side is on the opposite side of the paper passage side, a problem regarding the restriction associated with the paper passage may be reduced or even eliminated. Accordingly, it is possible to prevent the dimension of the printed board from expansion, while narrowing the width or the length in the narrow side direction.

Figure 3:
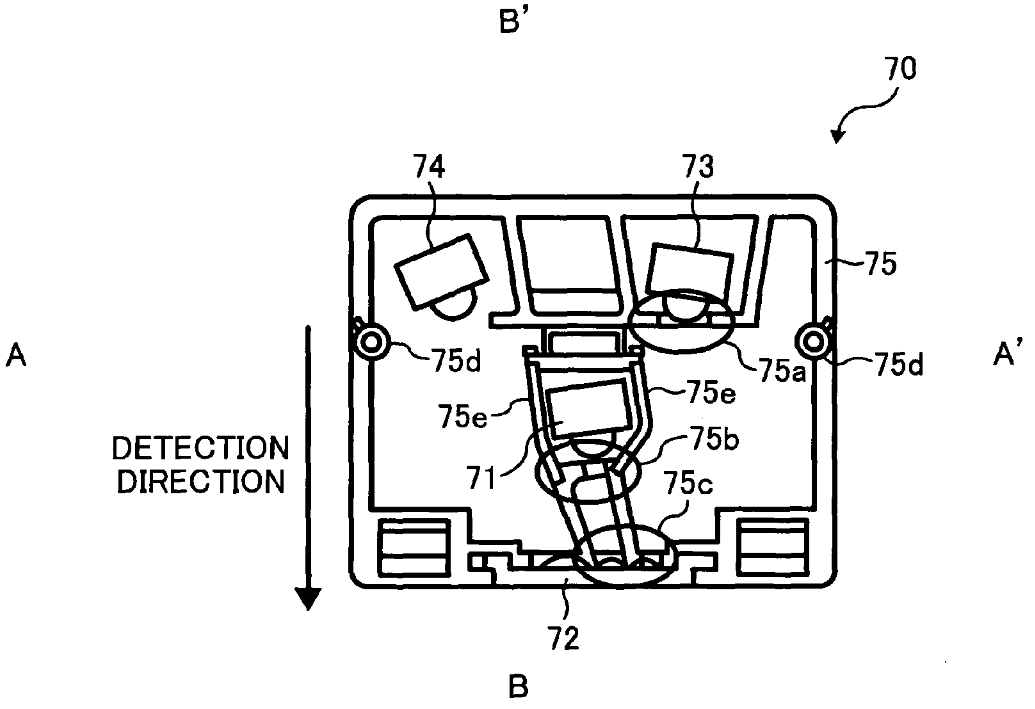
FIG. 3 is a schematic diagram of one of the plurality of photodetectors used in an optical detecting apparatus of the image forming apparatus shown in FIG. 1.
Figure 4:
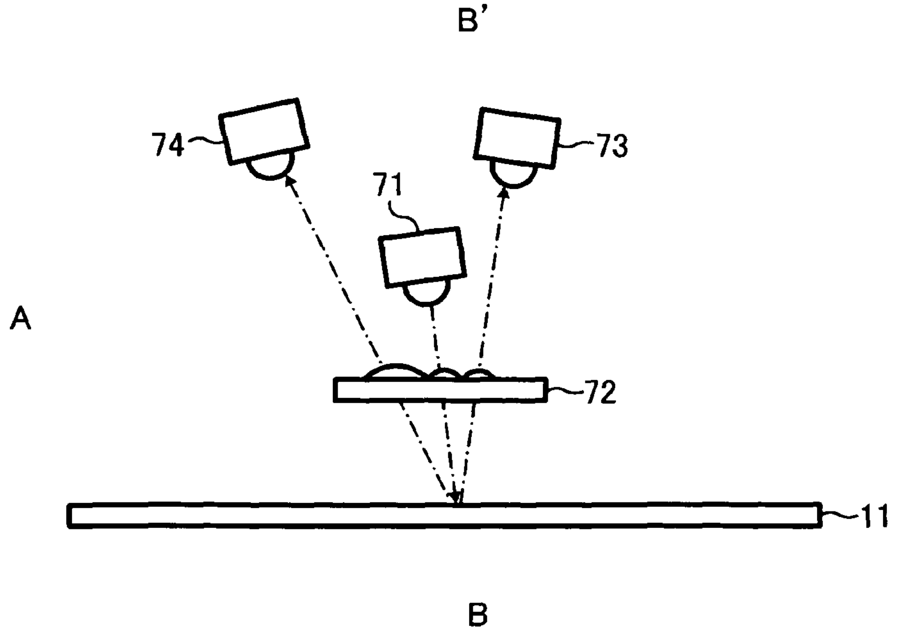
FIG. 4 is a schematic diagram illustrating example positions of a light-emitting element, a light-receiving element, and a lens included in each one of the plurality of photodetectors with respect to a detection target.

FIG. 3 illustrates one example of the photodetector 70 used in the optical detecting apparatus according to an embodiment of the present invention, and a light-emitting element (for example, light-emitting diode (LED)) 71, light-receiving elements (for example phototransistor (PTr)) 73 and 74, a lens 72 and a light shielding member (upper case) 75 are planarity illustrated. FIG. 4 illustrates the position of the light-emitting element (LED) 71 relative to the detection target 11 (for example, intermediate transfer belt), the light-receiving elements (PTr) 73 and 74, and the lens 72.

As illustrated in FIG. 4, light from the light-emitting element (LED) 71 passes through the lens 72, is emitted onto the detection target (intermediate transfer belt) 11 and is reflected by the detection target 11. Specularly reflected light and diffused light pass through the lens 72, and the specularly reflected light is concentrated in the specular reflection light-receiving element (PTr) 73, and the diffused light is concentrated in the diffuse reflection light-receiving element (PTr) 74.

The light shielding member (upper case) 75, as illustrated in FIG. 3, is formed of colored materials including carbon and the like, in order to prevent the emitted light from the light-emitting element 71 from directly entering the light-receiving elements (PTr) 73 and 74. In a gap between the light-emitting element 71, and the light-receiving elements 73 and 74 positioned at the both ends of the light-emitting element 71, shading walls 75*e* are provided. Furthermore, since optical processing such as holes for apertures 75*a*, 75*b* and 75*c* needs to be implemented, a polymer material (for example, polycarbonate and the like) which are easily molded by polymer molding is suitable.

FIG. 5 is a cross sectional view of the photodetector 70 in a B-B' direction. In this embodiment, as one of the methods for fixing the printed board 76 to the light shielding members (cases) 75 and 77, a structure, in which the printed board 76 is disposed between the light shielding members (cases) 75 and 77 which support both surfaces of the printed board 76, is implemented.

Furthermore, the case 75 is defined as the upper case which is the side where the optical elements (the light-emitting element 71, lens 72 and light-receiving elements 73 and 74) are disposed, while the opposite side thereof is the case 77 which is the lower case. Also, the lens 72 is secured by fitting the upper case 75 into the lower case 77. The printed board 76 has positioning bosses 75*d* for determining a position of the upper case 75, and slots for inserting the protrusions 77*b* and 77*c*. Accordingly, since the upper case 75 and the lower case 77 are fitted, having the printed board in between, the printed board 76 is securely fixed.

Figure 7A:
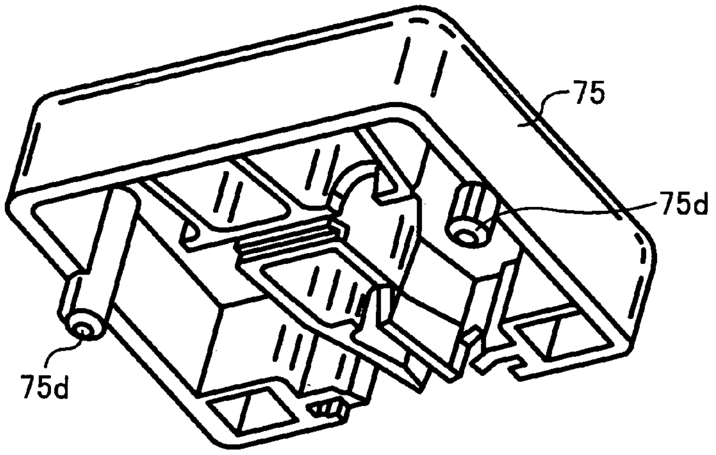
FIGS. 7A-7C are schematic diagrams illustrating example shapes of an upper case, a lens, and a lower case of the photodetector illustrated in FIGS. 3 and 5.
Figure 7B:
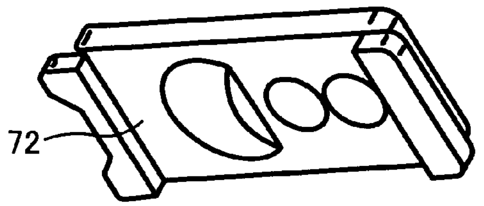
Figure 7C:
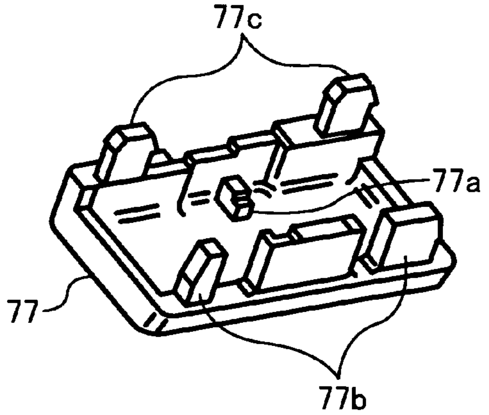

FIGS. 7A to 7C illustrate an example embodiment of a structure of the upper case 75 and the lens 72 of the photodetector 70, and the lower case 77 shown in FIG. 3 and FIG. 5.

If the above-described upper case 75 and the lower case 77 are not tightly fitted, the light from the light-emitting element (LED) 71 directly enters the light-receiving elements (PTr) 73 and 74 without being reflected, and the light is called crosstalk light. When crosstalk light is generated, detection accuracy of the photodetector is deteriorated, and thus it is desirable to not to have the crosstalk light. It is known that the crosstalk light is generated even in a gap in a wiring pattern formed of the copper foil and the like. For this reason, wiring is avoided around the mounting of optical elements as much as possible.

The circuit constituent parts (electronic parts) can be stored in the upper case 75 of the light-shielding member. However, it is problematic to store the circuit constituent parts in the upper case 75 for the following reasons. First, the circuit constituent parts become obstructions to the optical system. Another reason is that if the circuit constituent parts are disposed, complication of the wiring pattern on the printed board occurs, and noise by the crosstalk light increases. In order to reduce or even prevent the above-described problems, as shown in FIG. 5, it is suitable to store the circuit constituent parts 78*a* to 78*c* in the lower case 77.

Even if the circuit constituent parts 78*a* to 78*c* are enclosed, thereby slightly increasing the thickness of the lower case 77, there will not be as many restrictions as that of upper case 75. However, when detecting an image carrier (photoreceptor) such as a drum having a small diameter, it is possible that the thickness of the lower case 77 is desired to be thin. Assuming such a case, in this embodiment, as shown in FIG. 5, a gap D in which the size of parts will fit is provided to the lower case 77 so that the thickness of the lower case can be as thin as possible. In other words, by providing the gap D of 1.05 mm in depth in the lower case 77, the thickness of the lower case 77 does not exceed 2.4 mm.

It may be considered that since the circuit constituent parts are enclosed, the contact area of the printed board 76 and the lower case 77 decreases, thereby decreasing fitting strength for maintaining fixation. The effect to the fixation to the printed board 76 is insignificant, that is, the stability of the optical system is relatively maintained. However, as the fitting strength decreases, a gap is generated between the case 75 and 77, and the printed board 76, and the effect to the crosstalk light becomes significant. In other words, because the light-emitting element 71, the light receiving element 73 and 74 are allocated on the same surface, when the shading walls 75*e* slightly move away, light leaks from the gap, generating the crosstalk light.

The fitting strength in terms of the contact area cannot be increased. However, in this embodiment, at least one protrusion 77*a* for fitting is provided in the lower case 77 so as to increase the point fitting strength. Depending on the number of parts to enclose, the position and the number of the protrusion 77A are subject to change. However, by providing at least one protrusion 77A for fitting, the lower case 77 and the printed board 76 will be tightly fitted, thereby strengthening also fitting of the lower case 77 and the upper case 75, and fitting of the upper case 75 and the printed board 76. Accordingly, generation of a gap will be suppressed, preventing the crosstalk light.

Sensitivity or the gain of the specular reflection light-receiving element (PTr) 73 and the diffuse reflection light-receiving element (PTr) 74 of the photodetectors 70B for detecting toner density or a toner adherence amount, for example, is generally adjusted upon shipment. Adjustment is performed so that a ratio of the diffusion light against the specular light is at a certain level. However, in most cases, adjustment is performed in electronic parts such as semi-fixed resistors and variable resistors in which mainly the output gain is set to be adjustable. In addition, resistors, other than the semi-fixed resistors, which determine the gain, are used, sensitivity can be adjusted by replacing the resistors.

When the photodetectors are assembled on the printed board and the optical systems are completed, adjustment is performed to each optical system. Thus, gain adjustment cannot be performed before assembly. Therefore, the parts associated with the gain adjustment are not enclosed in the cases 75 and 77, but disposed on the printed board or the rear surface of the printed board outside the cases 75 and 77. Since the sensitivity adjustment parts are not enclosed in the cases 75 and 77, the sensitivity adjustment of the photodetectors 70 is performed as desired, and an optical detecting apparatus, which facilitates gain adjustment after assembly, is attained.

Embodiments of this invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. Embodiments of the present invention may also be implemented by the preparation of application specific integrated circuits or by interconnecting an appropriate network of conventional component circuits, as will be readily apparent to those skilled in the art.

Any of the aforementioned methods may be embodied in the form of a system or device, including, but not limited to, any of the structure for performing the methodology illustrated in the drawings.

Further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, such as floppy disks (trademark), cassette tapes, and removable hard disks; media with a built-in rewriteable non-volatile memory, such as memory cards; and media with a built-in ROM, such as ROM cassettes.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An image forming apparatus, comprising:

at least one image carrier;

at least one image forming mechanism to form a pattern image on at least one image carrier;

an image transfer member to receive the pattern image into register from the at least one image carrier and to carry the received pattern image; and an optical detecting mechanism including a substrate, an electric circuit, and a plurality of optical sensors, including at least one optical sensor to detect the pattern image carried on the image transfer member, each optical sensor including a light-emitting element connected to the electric circuit and mounted on the substrate, a light-sensitive element connected to the electric circuit and mounted on the substrate, and a light-shielding member to enclose the light-emitting element, the light-sensitive element, and at least a part of the electric circuit.

2. The image forming apparatus of claim 1, wherein the image transfer member includes one of an intermediate transfer looped-belt and a sheet transporting looped-belt, each of which is movably extended between a plurality of rollers and is to carry the pattern image on a surface thereof.

3. The image forming apparatus of claim 1, wherein the optical detecting mechanism is arranged at a position adjacent to the surface of the one of the intermediate transfer looped-belt and the sheet transporting looped-belt, to detect with a plurality of optical sensors, at least one of a positional displacement of the pattern image and a density of the pattern image.

4. The image forming apparatus of claim 1, wherein at least a part of the electric circuit enclosed by the light-shielding member in the optical detecting mechanism is disposed on back sides of the light-emitting element and the light-sensitive element.

5. The image forming apparatus of claim 1, wherein the optical detecting mechanism further includes a sensitivity adjuster to adjust a sensitivity threshold level, the sensitivity adjuster being arranged outside the light-shielding element.

6. The image forming apparatus of claim 1, wherein the electric circuit of the optical detecting mechanism includes wiring patterns and electrical components, and wherein the light-shielding member includes space in which at least a part of the electric circuit is enclosed.

7. The image forming apparatus of claim 1, wherein the light-shielding member of the optical detecting mechanism includes at least one protrusion in a surface thereof, held in contact with the substrate of the optical detecting mechanism.

8. The image forming apparatus of claim 1, wherein the electric circuit and the plurality of optical sensors are mounted on the substrate.

9. The image forming apparatus of claim 1, wherein light-shielding member is on a front surface of the substrate adjacent a paper passage.

10. The image forming apparatus of claim 9, wherein the substrate is between the light-shielding member and a lower case disposed on a rear surface of the substrate.

11. The image forming apparatus of claim 10, wherein the lower case is made of an insulating material.

12. The image forming apparatus of claim 10, wherein the light-shielding member and the lower case secure a lens therebetween.

13. An optical detecting apparatus, comprising:

a substrate;

an electric circuit; and a plurality of optical sensors, including at least one image sensor to detect a pattern image carried on an image carrying member, each optical sensor including a light-emitting element connected to the electric circuit and mounted on the substrate, a light-sensitive element connected to the electric circuit and mounted on the substrate, and a light-shielding member to enclose the light-emitting element, the light-sensitive element, and at least a part of the electric circuit.

14. The optical detecting apparatus of claim 13, wherein the image carrying member includes one of an image carrier, an intermediate transfer looped-belt, and a sheet transporting looped-belt.

15. A method for detecting at least one of displacement of transfer images and image density for an image forming apparatus, the method comprising:

disposing an optical detecting apparatus in an image forming apparatus to detect a belt surface adjacent to rollers of at least one of an image transfer body and a transfer material carrier of the image forming apparatus; and detecting at least one of displacement of a transfer image and image density via a plurality of photodetectors mounted on a single housing detecting pattern images transferred from a plurality of image carriers to at least one of the image transfer body and the transfer material carrier.

* * * * *